July 7, 1970     C. N. LEHTO     3,519,164

MULTI-LAYER LINER FOR A CONTAINER

Filed July 9, 1968     3 Sheets-Sheet 1

INVENTOR.
CHARLES N. LEHTO

BY *R. H. Hatton*
ATTORNEY

July 7, 1970

C. N. LEHTO 3,519,164

MULTI-LAYER LINER FOR A CONTAINER

Filed July 9, 1968

INVENTOR.
CHARLES N. LEHTO

BY

*R. H. Hatton*
ATTORNEY

United States Patent Office 3,519,164
Patented July 7, 1970

---

3,519,164
MULTI-LAYER LINER FOR A CONTAINER
Charles N. Lehto, Hudson, Ohio, assignor to The Goodyear Tire & Rubber Company, Akron, Ohio, a corporation of Ohio
Filed July 9, 1968, Ser. No. 743,534
Int. Cl. B65d 25/14
U.S. Cl. 220—63
13 Claims

ABSTRACT OF THE DISCLOSURE

A multi-layer lining of flexible corrosive-resistant material and the method by which it is applied, the lining covering the interior surface of a receptacle for corrosive substances. The lining includes at least one base or starter sheet adhered to the interior surface of the receptacle and a series of successive overlapping sheets to form a "chain-mail" type construction. A portion of each successive sheet is adhered to the interior of the receptacle and one or more remaining portions of each sheet overlaps and are adhered to a portion of the immediately preceding sheet to form a relatively smooth even multi-layer lining substantially free of splice projections. The smooth multi-layer lining is particularly useful to cover the interior surface of a pickle tank in which courses of brick are applied interiorly of and adjacent to the lining so as to be in direct contact with the acid in the tank.

BACKGROUND OF THE INVENTION

This invention relates to a multi-layer lining of flexible material to provide a protective covering over the surface of a receptacle for corrosive material, and more particularly to a multi-layer corrosive-resistant lining for an acid tank or the like. This invention also relates to a method for applying the multi-layer lining.

In lining receptacles such as tanks containing corrosive material it has been customary to protect the metal surface of the tank by adhering flexible material such as rubber or other elastomers so as to cover the interior surfaces of the tank. The elastomeric linings also act to distribute the shock to which the tank may be subjected. Since in most cases the tanks have large surface areas to be covered it is necessary that a plurality of sheets be applied thus creating a number of joints between abutting adjacent sheets. In order to prevent rapid seepage or migration of the corrosive substances through the joints these sheets are required to be spliced in various manners well known in the art. It has been common to use an overlap splice arrangement to cover these joints in which one end of a sheet is positioned over the adjacent end of the next preceding sheet for a distance of approximately two inches. This construction has proven its value in protecting metal surfaces from the effects of corrosive materials and remains very satisfactory for many applications. However, the overlap causes a projection in the splice area of the thickness of the rubber sheet which is undesirable if a relatively smooth, even lining surface is required.

Smooth lining surfaces have become a consideration, particularly in applications where layers of refractory material such as bricks are added to the tank immediately interiorly of the elastomeric lining and in direct contact with the corrosive substance in the tank. For example, in pickling tanks used in the metal processing industry a lining surface free of splice projections facilitates the installation of courses of brick which are frequently employed as a protective barrier against the elevated temperatures used to accelerate the pickling process and also against physical damage to the elastomeric lining. Furthermore, the smooth surface will more readily accommodate brick movement due to thermal or mechanical effects which can cause a rupture of the lining if the lining protrudes as in the splice area.

Various efforts have been made to achieve a smooth lining surface when more than one layer of lining is to be applied. For instance, in Saxman U.S. Pat. No. 3,286,822 FIG. 2 discloses a claimed smooth lining structure for a pickle tank in which a first layer of rubber is bonded to the inner surface of the shell of the tank and a second layer or rubber is positioned over the first layer. Each layer is formed by a sheet of rubber of substantial thickness with the joints in the first layer being staggered from the joints in the second layer. An alternate arrangement shown in FIG. 3 of the above patent discloses a smooth lining attained by filling the space between the customary lapped joints with a sheet of rubber of the same thickness.

However, previous constructions have not overcome the shortcomings of having a number of spliced joints in the lining structure. Whether these spliced joints be butted, skived, or the conventional overlapped type, the problem of failure in the splice area remains due to the relative ease of seepage of the corrosive substances through the joints. More importantly, the prior art installations do not provide for a well planned systematic approach to lining a receptacle which will minimize or eliminate splices and adequately prevent the coincidence or intersection of joints in adjacent rubber layers. The lining and method of application taught by the present invention will result in increased life of not only the lining but also the receptacle to which the lining is adhered.

The present invention largely overcomes these difficulties by providing a multi-layer lining having a relatively smooth, exposed surface formed of a plurality of sheets of flexible, corrosive-resistant material featuring at least one base or starter sheet adhered to the interior surface of the receptacle and a series of successive overlapping sheets to cover the remaining interior surface of the receptacle forming a "chain-mail" like effect. A first substantial portion of each sheet covers and is adhered to the receptacle surface adjacent the surface to which the preceding sheet is adhered and a second portion of each sheet substantially completely overlaps and is adhered to the first portion of its preceding sheet.

In this way joints and splices in each individual sheet are kept to a minimum and there are no conventional joints in adjacent layers to come in contact to increase the chances of seepage of the corrosive substance through the joints. In addition the substantial overlapping portions make the chance of deterioration of the metal receptacles remote since the corrosive substances must migrate through a much longer distance than when the customary two inch overlap construction is employed.

The overlap construction of the present invention will also accommodate a greater expansion of the metal tank due to thermal expansion without extending the lining to a point of failure, and will provide the tank with increased shock resistance by distributing the shock over a wider area.

OBJECTS OF THE INVENTION

It is a primary object of this invention to provide a multi-layer lining having a smooth, even surface to cover the interior surface of a receptacle for corrosive material.

It is another primary object of this invention to provide a systematic method for applying a multi-layer lining to a receptacle for corrosive material having a minimum of splice areas.

It is a further object of this invention to provide a relatively smooth, even multi-layer lining for a pickle tank which will more readily accommodate the movement of the bricks and metal of the tank due to thermal or mechanical effects without damage to the lining.

It is still another object of this invention to provide a multi-layer lining which will have greater shock distributing properties.

Other objects and advantages of this invention will become apparent hereinafter as the description thereof proceeds, the novel features, arrangements and combinations being clearly pointed out in the specification as well as the claims hereunto appended.

DESCRIPTION OF THE PREFERRED EMBODIMENTS

Figure 1:
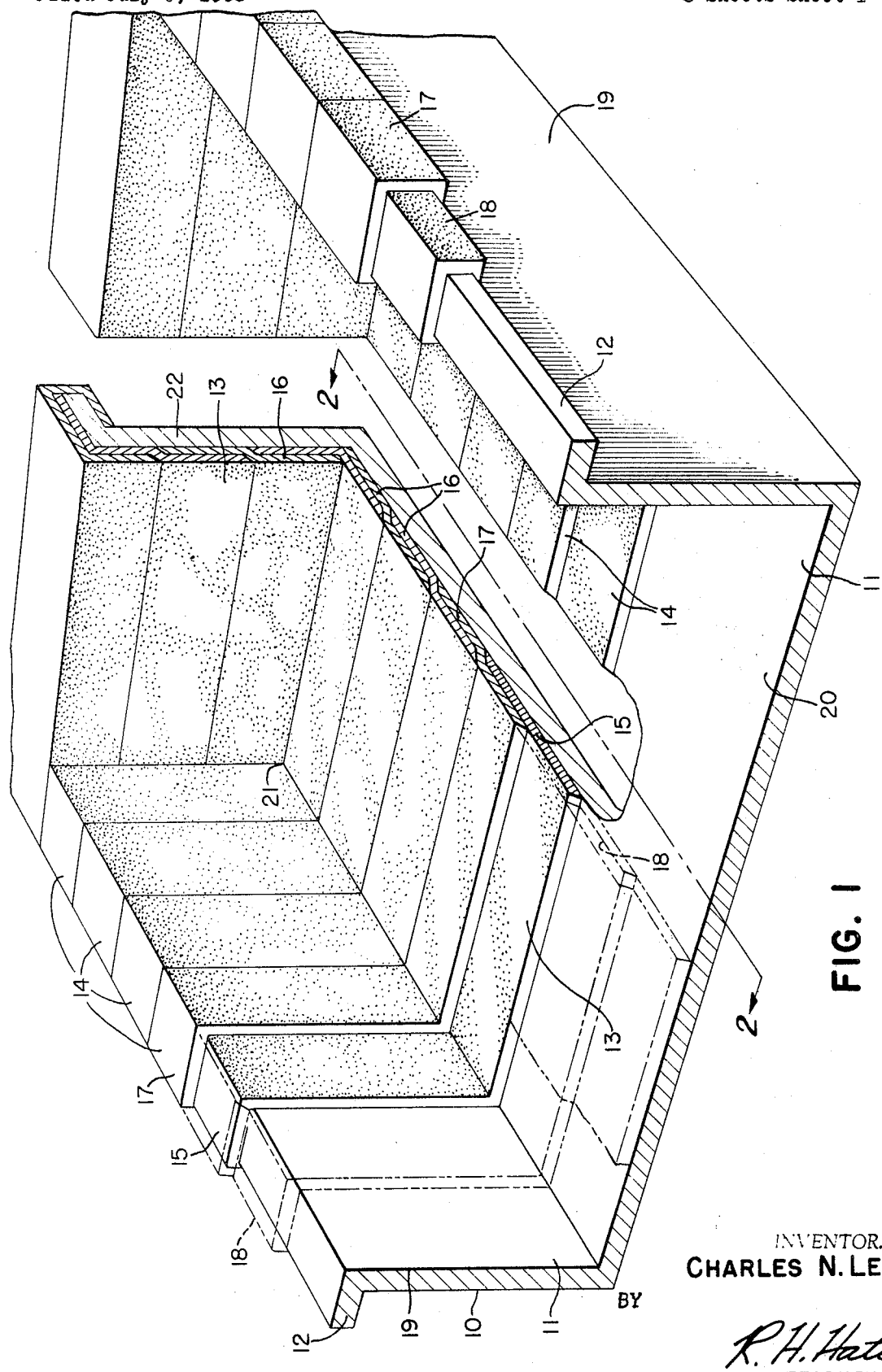
FIG. 1 is a fragmentary perspective view of a lined receptacle with parts broken away and one end cut away to reveal its inner surface covered by the multi-layer lining of this invention.

In FIG. 1, a metal receptacle 10 of a generally rectangular shape has its interior surface 11 and flange 12 covered by a flexible multi-layer lining 13 preferably of natural or synthetic rubber or other elastomeric material specifically formulated to resist corrosive substances which will be contained in the receptacle 10. The interior surface 11 of the receptacle 10 is prepared for the application of the lining according to established procedures, for example, cleaning the surface of the metal before the application of a suitable rubber-to-metal adhesive system. The lining 13 acts to protect the interior surface 11 of the receptacle 10 against the effects of the corrosive substances and also to distribute at least a portion of any shock to which the receptacle 10 is subjected. Naturally, it is to be understood that the receptacle 10 could have other shapes such as cylindrical without departing from the concepts of the invention as hereinafter described.

The multi-layer lining 13 is made up of a plurality of generally rectangular calendered or extruded sheets 14 of rubber placed transversely across the interior surface 11 of the receptacle 10 preferably from flange 12 to flange 12. Of course, conversely the sheets may also be placed longitudinally of the receptacle 10 if desired, the particular direction being immaterial. The sheets 14 are adhered to the receptacle surface 11 and to each other by means of suitable adhesives.

FIG. 1 further illustrates that one surface of the base or starter sheet 15 is adhered to the surface 11 of the receptacle 10 and a series of successive overlapping sheets 16, including the first sheets 17 and 18 of the series (shown partially in dotted lines for clarity), cover the remaining surface 11 of the receptacle 10. The base sheet 15 may be placed in any location on the interior surface 11 of the receptacle 10, for instance in an intermediate position on the interior surface 11 of the side walls 19 and across the floor 20 of the receptacle 10 as shown, at one of the corners 21 thereof, or in other locations in the receptacle 10 such as on the end walls 22. In each case, the ease of installation should determine the exact location and more than one base sheet 15 may be applied depending upon the particular installation. The size of the base sheet 15 may vary for example in width from 12 inches up to 48 inches and is normally at least ¼ to ⁵⁄₁₆ inch thick, but the thickness may also vary as much as from ⅛ to ½ inch.

Figure 2:
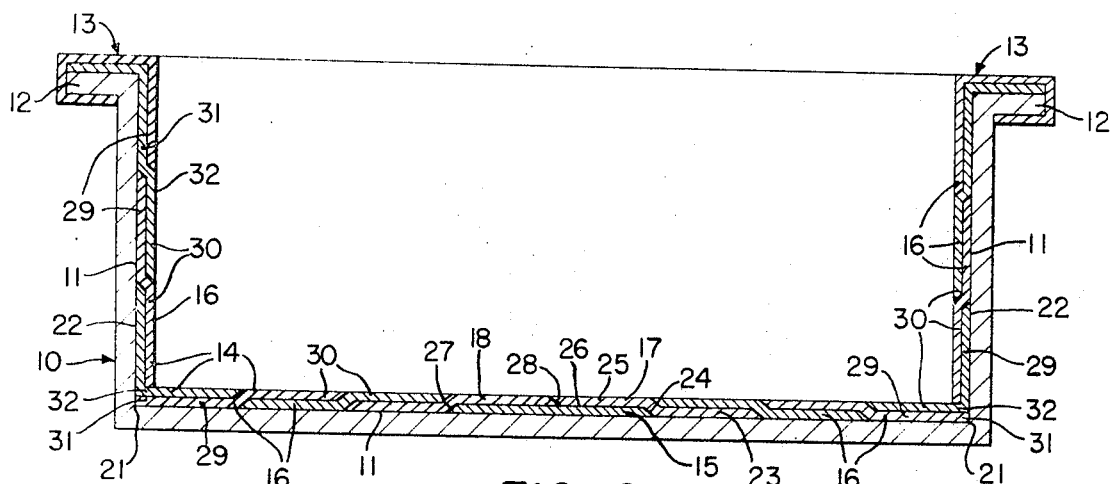
FIG. 2 is a section of the lined receptacle taken on line 2—2 of FIG. 1.

The arrangement of the sheets 14 is more clearly shown in FIG. 2 which further illustrates the first sheet 17 of the series of successive overlapping sheets 16 having a substantial portion 23 thereof extending from one edge 24 of the base sheet 15 in contact with and adhered to the surface 11 of the receptacle 10. The remaining substantial portion 25 of the first sheet 17 overlaps and is adhered to a portion of the exposed surface 26 of the base sheet 15. Similarly, the other first sheet 18 in the series of successive sheets 16 extends in the same manner from the opposite edge 27 of the base sheet 15. The first sheets 17 and 18 therefore completely cover the exposed surface 26 of the base sheet 15 and connect to form a joint 28 thereover. The edges of the base sheet 15 and successive overlapping sheets 16 are preferably skived at about a 30 to 45 degree angle to provide a greater contact area between adjacent sheets which significantly increases the adhesion or bond strength therebetween. In addition, these skived edges act to relieve the concentrated stresses created in the contact areas between adjacent sheets and minimize the bridging that would form undesirable gaps in the contact areas.

Each successive sheet 16 has a substantial portion 29 covering and adhered to the receptacle surface 11 adjacent the surface to which the preceding sheet is adhered and portion 30 which substantially completely overlaps and is adhered to the portion 29 of its preceding sheet. Typically, the first sheets 17 and 18 and the successive overlapping sheets 16 are calendered or extruded in widths of 36 to 48 inches and thicknesses of from ⅛ to ½ inch with the normal thickness range varying from ¼ to ⁵⁄₁₆ inch. Of course, in any one lining application the sheets 14 including base sheet 15, first sheets 17 and 18, and successive sheets 16 should have the same thickness and at least all the successive sheets 16 should be of generally the same dimensions.

The base sheet 15 and all the portions 29 of the series of successive overlapping sheets 16 form a first substantially continuous lining layer 31 over the surface 11 of the receptacle 10, and all the overlapping portions 30 of the series of successive sheets 16 form a substantially continuous lining layer 32 over the first lining layer 31 to provide a relatively smooth, even lining 13 of two layers over the interior surface 11 of the receptacle 10. Therefore, as is more readily seen in FIG. 3, each lining layer 31 and 32 is formed from portions 29 and 30 of the successive sheets 16 rather than being made up entirely from sheets lying in abutting relationship in the same plane as has been customary in the past.

Figure 3:
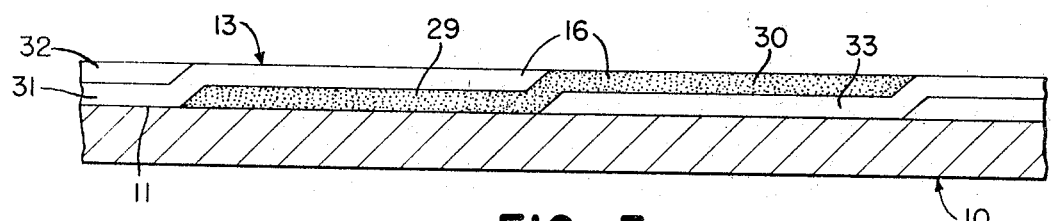
FIG. 3 is an enlarged partially sectioned fragmentary view showing a portion of the lining of FIG. 2.

In FIG. 3, the sheet 16 of a standard calendered width, for example, 48 inches, has a portion 29 of approximately one-half the width of the sheet 16 adhered to the interior surface 11 of the receptacle 10 and the remaining portion 30 overlapped onto and adhered to the preceding sheet 33. The area of the portion 30 of the sheet 16 is therefore approximately one-half of the total area of the sheet 16. With this rather extensive overlap the chances of deterioration of the metal receptacle 10 are remote since the corrosive substance must migrate through a substantial distance. It is also significant, that with this arrangement there are no conventional joints present in layers 31 and 32 and therefore no possibility of joints in adjacent layers coming in contact or being in close proximity to facilitate seepage of the corrosive substances through the joints. The thickness of each sheet 16 is in this instance ¼ inch, therefore the thickness of each layer 31 and 32 is ¼ inch with an overall thickness of the lining 13 being ½ inch.

The preferred method of applying the multi-layer lining 13 of this invention may be illustrated by reference to FIGS. 1, 2 and 3. For example, after the interior surface 11 of the receptacle 10 is properly cleaned and cemented with a rubber-to-metal adhesive system, one surface of the base sheet 15 is coated with a rubber tack adhesive or solvent wash and completely adhered to the interior surface 11 of the receptacle 10. In the present instance, the sheet 15 is placed at an intermediate position on the side walls 19 and the floor 20 of the receptacle 10 preferably in one sheet extending across the receptacle 10 from flange 12 to flange 12. A rubber tack cement or solvent wash is also applied over the exposed surface 26 of the base sheet 15 and to a portion of the surface 11 adjacent to the base sheet 15. Subsequently, the series of successive overlapping sheets 16 are applied in sequence with the first sheet 17 beginning, for instance, at one edge 24 of the base sheet 15.

In applying the first sheet 17, the portion 25 thereof is superposed and adhered to a portion of the exposed surface 26 of the base sheet 15 and the portion 23 of the first sheet 17 is adhered to the suface 11 of the receptacle 10 adjacent the base sheet 15. Similarly, the other first sheet 18 of the series of sheets 16 is applied in the same manner from the opposite edge 27 of the base sheet 15 and is joined to the first sheet 17 to form the joint 28 therebetween.

Then the portion 30 of each successive sheet 16 is superposed and adhered to the portion 29 of the immediately preceding sheet 16 and the portion 29 of each successive sheet 16 is adhered to the surface 11 of the receptacle 10 adjacent the portion 29 of the immediately preceding sheet 16. Of course, if desired the order of applying the portions 29 and 30 may be reversed. Prior to the application of each successive sheet 16 a suitable adhesive is applied to the bottom surface of each preceding sheet 16, to the exposed surfaces of the portions 29 of each preceding sheet 16, and also to the surfaces 11 of the receptacle 10 adjacent the portion 29 of each preceding sheet 16.

After all the sheets 14 have been positioned in the receptacle 10, they are preferably rolled or stitched to eliminate trapped air in accord with the well-known techniques. As mentioned previously, the edges of the sheets 14 are preferably skived in order that this be more readily accomplished.

Once the application of the lining is completed, it preferably is vulcanized usually either by the application of heat or chemically in accord with the standard procedures.

It should be apparent to one skilled in the art that this invention provides a systematic method for applying a multilayer lining for a receptacle in which the lining has a minimum of splice areas and a relatively smooth surface.

It should also be apparent that it is possible by applying the teachings of this invention to form multi-layer linings of almost unlimited total thickness without overlapping splices to create an uneven surface.

Figure 4:
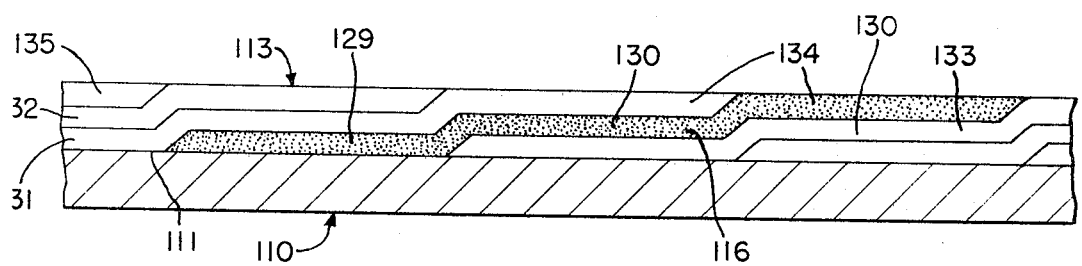
FIG. 4 is a modification of the invention shown in FIG. 3.

This unique aspect of the present invention is more clearly illustrated in FIG. 4 which shows that the sheet 116 may also include a portion 134 adhered to and substantially completely overlapping the portion 130 of its preceding sheet 133. In this way a third lining layer 135 may be formed by all the overlapping portions 134. In this case, again assuming a standard calender width of 48 inches, the portion 129 of sheet 116 adhered to the surface 111 of the receptacle 110 may have a width of 16 inches or approximately one third the width of the sheet 116. The area covered by the substantially equal overlapping portions 130 and 134 of the sheet 116 is approximately two-thirds of the area of the sheet 116.

Figure 5:
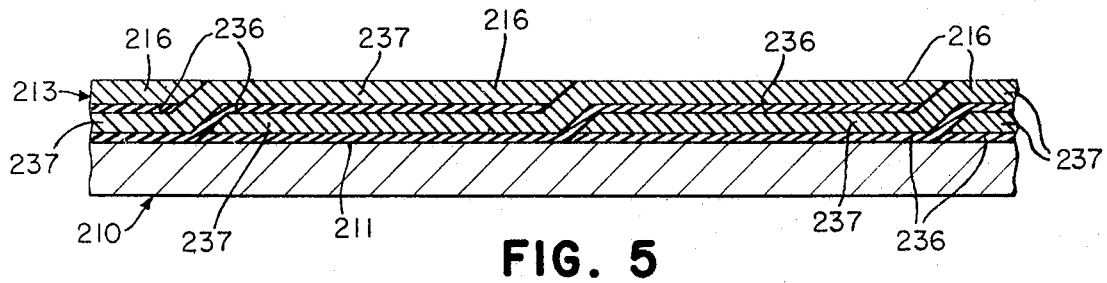
FIG. 5 is another form of the invention shown in FIG. 3.

As shown in FIG. 5 the individual sheets 16 forming the multi-layer lining of this invention may, instead of being homogeneous and composed of one type of elastomer, be a lamination containing blends or combinations of plies of dissimilar elastomers. For example, each sheet 216 can include tie ply 236 of soft rubber or "tie gum" which effects adhesion of a portion of the sheet to the surface 211 of the receptacle 210 and another portion to a portion of the preceding sheet. The tie ply 236 is composed of compounds of either natural or synthetic rubber or combinations thereof. The tie ply 236 will distribute at least a portion of any shock to which the receptacle 210 is subjected. A protective ply 237 of hard rubber is positioned adjacent to the tie ply 236 and is compounded to resist the deteriorating effects of the corrosive material in the receptacle 210. The protective ply 237 may be composed of any well known corrosion resistant elastomers or combinations thereof.

For the purposes of this specification it is to be understood that the term "hard rubber" is meant to include any hard or semi-hard elastomeric compound in the Shore D durometer hardness range of 40 to 90.

Figure 6:
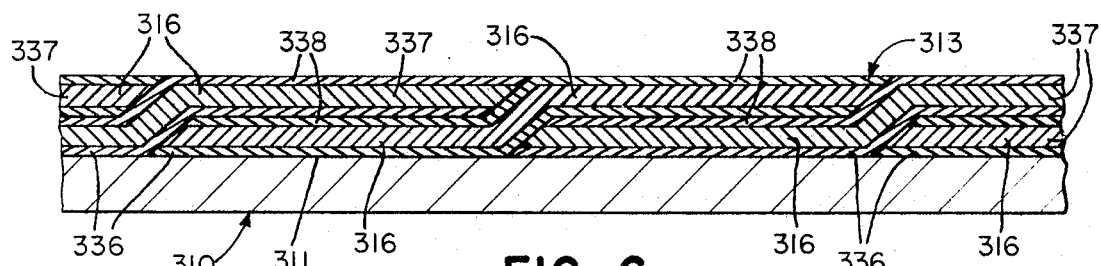
FIG. 6 is a modification of the invention shown in FIG. 5.

FIG. 6 shows a modification of the two-ply construction of FIG. 5 in which each sheet 316 includes an additional protective ply 338 substantially covering the protective ply 337 to form a three-ply arrangement 336, 337 and 338. The additional protective ply 338 is specifically formulated to withstand the corrosive effects of the particular acid or alkaline material to which the lining 313 will be exposed and also to provide protection against other harmful ingredients which may be present. The choice of elastomer will be influenced by such factors as resistance to oil, heat, and abrasion. In addition, ply 338 may be either a hard, semi-hard, or soft rubber depending upon the particular application. Of course, other additional plies of rubber may be added if desired.

Figure 7:
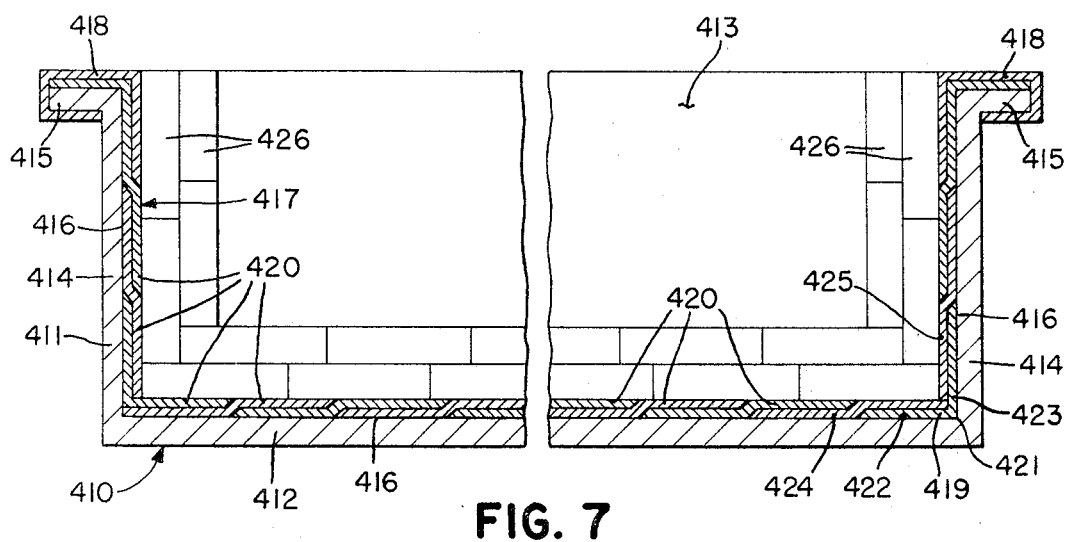
FIG. 7 is a longitudinal section through a metal pickling tank which has its inner metal surfaces covered by the multi-layer lining of this invention.

FIG. 7 shows a typical pickling tank 410 employed in the metal processing industry and the type of receptacle in which the systematic application of the multi-layer lining of this invention is particularly suited. The rigid structure or shell 411 of the tank 410 is generally constructed of welded steel plates forming a rectangular structure having a floor 412, side walls 413, end walls 414 and a peripheral flange 415. The interior surfaces 416 of the rigid structure 411 and flange 415 are covered by the corrosive resistant multi-layer elastomeric lining 417 to protect them against the sulphuric, hydrochloric or other acids contained in the tank 410. The individual pickling tanks are typically 8 to 12 feet wide, 6 to 10 feet in depth, and from 40 to 45 feet long. It is common to place several tank sections end to end to form a continuous line to process long length steel strips. The tanks are also occasionally placed side by side for applications involving batch pickling.

The multi-layer lining 417 is formed from rectangular sheets of rubber 418 including a base sheet 419 and a series of successive overlapping sheets 420. As explained previously, these sheets may be homogeneous but are preferably a two or three ply laminated construction. The multilayer, "chain-mail" type construction and the method of application has been previously described in FIGS. 1 through 6.

It should be noted that the base sheet 419 in the present instance is located at a corner 421 of the tank 410 with a portion 422 adhered to the floor 412 of the tank 410 and the other substantially equal portion 423 is adhered to the end wall 414 of the tank 410. The series of successive overlapping sheets 420, beginning with the first sheets 424 and 425 of the series, are positioned across the side walls 413 and floor 412 and on the end walls 414 of the tank 410.

Because of the modern-day rapid pickling procedures, the elevated operating temperatures are usually in excess of those allowed for direct exposure to rubber or other elastomeric material. Consequently, it is almost always required that one or more courses of acid resistant bricks 426 or other suitable refractory material be placed over the rubber lining 417 and in direct contact with the acid in the tank 410. The bricks 426 also act to protect the lining 417 against possible damage from physical abuse.

The absence of an excessive number of projections in the relatively smooth multi-layer lining 417 facilities the installation of the courses of bricks 426 and more readily accommodates the movement of bricks 426 due to thermal or mechanical effects which may rupture the lining 417. Similarly the "chain-mail" like lining 417 will also accommodate a greater expansion of the rigid structure 411 of the metal tank 410 due to thermal expansion without detrimentally affecting the lining 417. Furthermore, as mentioned previously, the lining 417 will provide the tank 410 and rigid structure 411 with increased shock resistance by distributing the shock over a wider area.

While certain representative embodiments and details have been shown for the purpose of illustrating the invention, it will be apparent to those skilled in this art that various changes and modifications may be made therein without departing from the spirit or scope of the invention.

What is claimed is:

1. A multi-layer lining of flexible material to provide a protective covering over the interior surface of a receptacle for corrosive material, said lining having a relatively smooth, exposed surface formed of a plurality of sheets of flexible, corrosive resistant material, said lining comprising:
   (a) at least one base sheet with one entire surface thereof adhered by means of an adhesive to the surface of the receptacle;
   (b) a series of successive overlapping sheets covering the remaining surface of said receptacle, the first of said sheets having a substantial first portion thereof extending from one edge of said base sheet in contact with the surface of the receptacle and adhered thereto by means of an adhesive and the remaining substantial second portion thereof overlapping and adhered by means of an adhesive to the exposed surface of said base sheet, with each successive sheet having:
      (1) a first substantial portion thereof covering and adhered by means of an adhesive to the receptacle surface adjacent the surface to which the preceding sheet is adhered; and
      (2) a second portion thereof substantially completely overlapping the first portion of its preceding sheet and adhered thereto by means of an adhesive; and
   (c) said base sheet and the first portions of said successive sheets thereby forming a first substantially continuous layer over the surface of the receptacle, and the second portions of said successive sheets thereby forming a substantially continuous second lining layer over the first layer to provide a relatively smooth, even lining surface thereover.

2. The lining as claimed in claim 1 wherein the area of the second portion of each said successive sheet is approximately one-half of the total area of said successive sheet.

3. The lining as claimed in claim 1 wherein each said successive sheet also includes a third portion adhered by means of an adhesive to and substantially completely overlapping the second portion of its preceding sheet, the third portions of said successive sheets thereby forming a substantially continuous third lining layer over the second lining layer.

4. The lining as claimed in claim 1 wherein each sheet further includes:
   (a) a tie ply of soft rubber to effect adhesion of a portion of the sheet to the surface of the receptacle to be lined and another portion to the first portion of the preceding sheet, said tie ply also distributing at least a portion of any shock the receptacle is subjected to, and
   (b) a protective ply of hard rubber adjacent to said tie ply to resist the deteriorating effects of the corrosive material and provide protection thereagainst.

5. The lining as claimed in claim 3 wherein the area of the second and third overlapping portions of each said successive sheet is approximately two-thirds of the total area of said successive sheet.

6. The lining as claimed in claim 4 wherein each sheet further includes a second protective ply of corrosive-resistant rubber substantially covering the first mentioned protective ply, said second ply being specifically formulated to withstand the particular corrosive effects of the material to which the lining is being exposed and also to provide protection against other harmful ingredients which may be present.

7. A tank for corrosive substances comprising:
   (a) a rigid structure having a plurality of horizontal and vertical surfaces to be protected against the effects of the corrosive substance; and
   (b) a multi-layer corrosive resistant lining of elastomeric material adhered by means of an adhesive to said surfaces, said lining having a relatively smooth, exposed surface formed of a plurality of substantially rectangular sheets, and including:
      (1) at least one base sheet with one entire surface thereof adhered by means of an adhesive to a surface of the rigid structure; and
      (2) a series of successive overlapping sheets covering the remaining surfaces of the rigid structure, the first of said sheets having a substantial portion thereof extending from one edge of said base sheet in contact with the surface of the rigid structure and the remaining substantial portion thereof overlapping and adhered by means of an adhesive to the exposed surface of said base sheet with each successive sheet having:
         (a) a first substantial portion thereof adhered by means of an adhesive to the surface of the rigid structure adjacent the preceding surface to which the preceding sheet is adhered; and
         (b) a second portion thereof substantially completely overlapping the first portion of its preceding sheet and adhered thereto by means of an adhesive; and
      (3) said base sheet and first portions of said successive sheets thereby forming a first substantially continuous layer over the surfaces of the rigid structure, and the second portions of said successive sheets thereby forming a substantially continuous second lining layer over the first layer to provide a relatively smooth, even lining surface thereover.

8. The tank as claimed in claim 7 wherein the tank also comprises one or more courses of brick adjacent said lining and in direct contact with the corrosive substance in the tank to provide additional protection for the surfaces of the rigid structure to be lined.

9. The tank as claimed in claim 7 wherein the area of the second portion of each said successive sheet is approximately one-half of the total area of said successive sheet.

10. The tank as claimed in claim 7 wherein each said successive sheet also includes a third portion adhered by means of an adhesive to and substantially completely overlapping the second portion of its preceding sheet, the third portions of said successive sheets thereby forming a substantially continuous third lining layer over the second lining layer.

11. The tank as claimed in claim 7 wherein each sheet further includes:
   (a) a tie ply of soft rubber to effect adhesion of a portion of the sheet to the surface of the rigid structure to be lined and another portion to the first portion of the preceding sheet, said tie ply also distributing at least a portion of any shock the rigid structure is subjected to, and
   (b) a protective ply of hard rubber adjacent to said tie ply to resist the deteriorating effects of the corrosive material and provide protection thereagainst.

12. The tank as claimed in claim 8 wherein the area of the second and third overlapping portions of each said successive sheet is approximately two-thirds of the total area of said successive sheet.

13. The tank as claimed in claim 9 wherein each sheet further includes, a second protective ply of corrosive-resistant rubber substantially covering the first mentioned protective ply, said second ply being specifically formulated to withstand the particular corrosive effects of the material to which the lining is being exposed and also to provide protection against other harmful ingredients which may be present.

References Cited

UNITED STATES PATENTS

| 1,739,843 | 12/1929 | Knight | 220—63 |
| 1,919,366 | 7/1933 | Haines | 206—2 X |
| 2,189,459 | 2/1940 | Derby | 220—63 |
| 2,321,777 | 6/1943 | Schelhammer et al. | 220—63 |
| 3,286,822 | 11/1966 | Saxman | 206—2 |
| 3,379,336 | 4/1968 | Stedfeld | 220—63 |

RAPHAEL H. SCHWARTZ, Primary Examiner

U.S. Cl. X.R.

206—2; 217—4